US011287952B2

(12) United States Patent
Zhang et al.

(10) Patent No.: US 11,287,952 B2
(45) Date of Patent: Mar. 29, 2022

(54) DYNAMIC CONTEXTUAL MENU

(71) Applicant: MICRO FOCUS LLC, Santa Clara, CA (US)

(72) Inventors: Bing Zhang, Shanghai (CN); Da-Long Sun, Shanghai (CN); Li Zhang, Shanghai (CN); Rong-Feng Chen, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/967,644

(22) PCT Filed: Mar. 30, 2018

(86) PCT No.: PCT/CN2018/081345
§ 371 (c)(1),
(2) Date: Aug. 5, 2020

(87) PCT Pub. No.: WO2019/183926
PCT Pub. Date: Oct. 3, 2019

(65) Prior Publication Data
US 2021/0255742 A1 Aug. 19, 2021

(51) Int. Cl.
*G06F 3/0482* (2013.01)
*G06F 3/0486* (2013.01)
*G06F 3/0488* (2022.01)
(52) U.S. Cl.
CPC .......... *G06F 3/0482* (2013.01); *G06F 3/0486* (2013.01); *G06F 3/0488* (2013.01)

(58) Field of Classification Search
CPC ..... G06F 3/0482; G06F 3/0488; G06F 3/0486
See application file for complete search history.

(56) References Cited

U.S. PATENT DOCUMENTS

| 5,283,560 A | 2/1994 | Bartlett |
| 8,631,350 B2 | 1/2014 | Lepage |

(Continued)

FOREIGN PATENT DOCUMENTS

CN        102637125 A        8/2012

OTHER PUBLICATIONS

Material Design—Components—Menus; https://material.io/guidelines/components/menus.html#menus-usage; Nov. 21, 2017; 33 pages.

(Continued)

*Primary Examiner* — Mong-Shune Chung

(57) ABSTRACT

Content items and a dynamic menu element are displayed. Responsive to selection and dragging of the dynamic menu element over a particular content item, a menu of actions contextual to the particular content item is displayed, and the particular content item is highlighted to indicate that the displayed menu is related to the particular content item. Responsive to release of the dynamic menu element over the particular content item, the displayed menu is rendered actionable so that the actions thereof selectable; prior to release of the dynamic menu element over the particular content item, the displayed menu is non-actionable and no action is selectable. Responsive to selection of a specific action of the menu being displayed, the selected specific action is performed in relation to the particular content item.

20 Claims, 4 Drawing Sheets

(56) References Cited

U.S. PATENT DOCUMENTS

| | | |
|---|---|---|
| 8,768,824 B2 | 7/2014 | Friesen |
| 8,869,068 B2 | 10/2014 | Primiani |
| 2007/0271528 A1 | 11/2007 | Park |
| 2009/0064055 A1 | 3/2009 | Chaudhri |
| 2014/0115540 A1* | 4/2014 | Ikeda .................... G06F 3/0486 715/835 |
| 2014/0282248 A1 | 9/2014 | Reeves |
| 2014/0344738 A1* | 11/2014 | Lai .......................... G06F 9/451 715/769 |
| 2015/0058808 A1* | 2/2015 | John ..................... G06F 3/0488 715/835 |
| 2015/0128079 A1 | 5/2015 | Kim |
| 2015/0212667 A1 | 7/2015 | Holt |
| 2018/0239520 A1* | 8/2018 | Hinckley .............. G06F 3/0482 |

OTHER PUBLICATIONS

PCT Search Report/Written Opinion; PCT/CN2018/081345; dated Jan. 4, 2019; 9 pages.

* cited by examiner

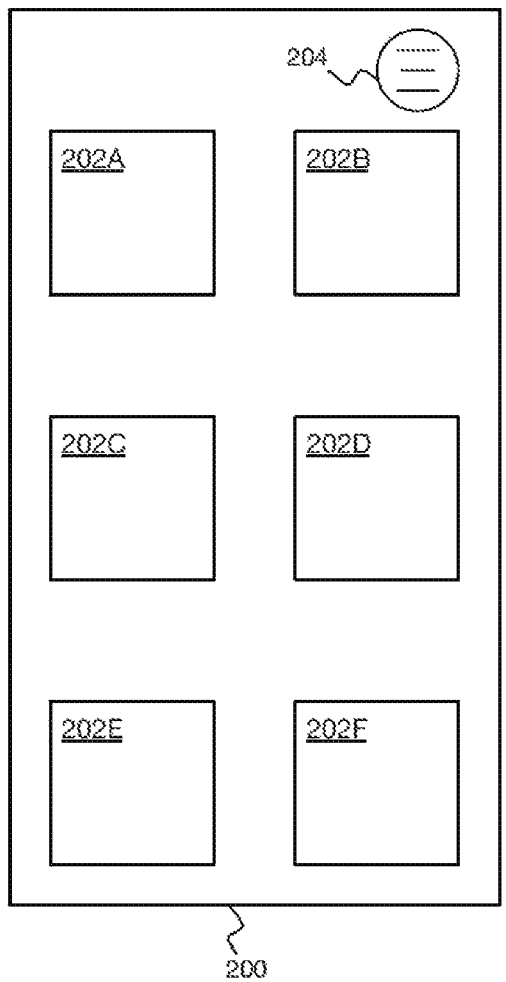
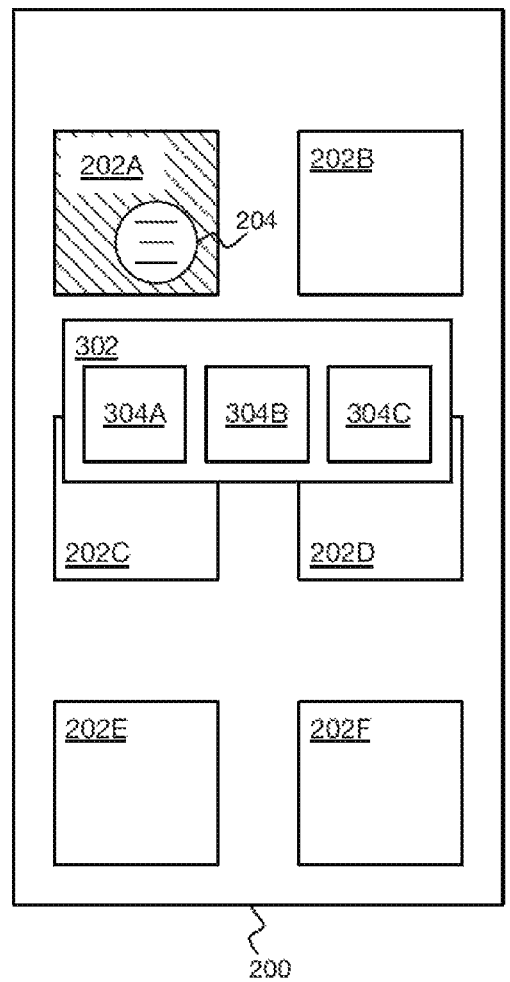
FIG. 2
FIG. 3

DYNAMIC CONTEXTUAL MENU

BACKGROUND

Mobile computing devices, particularly smartphones, have become increasingly popular, and indeed have become the primary computing devices of many people, supplanting other computing devices like laptop and desktop computers in this respect. A hallmark of a prototypical mobile computing device like a smartphone is a touchscreen as the primary input mechanism of the device, in lieu of physical keyboards and separate pointing devices like touchpads and mice as typically employed with desktop and laptop computers. While mobile computing devices, including smartphones, have increased in size, even the largest of such devices still typically have smaller displays than those commonly used with desktop and laptop computers.

BRIEF DESCRIPTION OF THE DRAWINGS

FIGS. 2, 3, 4, and 5 are diagrams of example performance of various parts of the example method of FIG. 1.

DETAILED DESCRIPTION

As noted in the background section, mobile computing devices like smartphones, while exceedingly popular, usually have smaller displays than other computing devices people use, such as desktop and laptop computers. Such smaller sized displays, in conjunction with the displays also acting as input devices in the case of touchscreens, can make user interaction with content items displayed on the touchscreens more challenging. For example, the touchscreen of a mobile computing device may display a number of different content items, each of which has a set of actions from which a user can select a particular action to perform in relation to the content item in question.

Different smartphone operating systems, and different application programs, or "apps," running on smartphones, employ different approaches to permit a user to select an action from a set of actions to perform in relation to a content item. A content item may include a small menu button displayed in a corner of the content item. This approach lends itself to visually indicating or advertising to the user that there are one or more actions that can be performed in relation to the content item. However, the small size of the menu button can make selection of the menu button difficult, particularly for a mobile computing device that has a touchscreen.

Another approach that small operating systems and application programs use is the "long press." A user touches the touchscreen where a content item is displayed with his or her fingertip, for instance, and maintains this fingertip at the initially touched location for a duration of time longer than is done to simply select the content item. In response, a menu of actions is displayed, from which a user can select a particular action to perform in relation to the content item. This approach, however, can require that a user know in advance that the content item is receptive to a long press to bring up display of a menu of actions, which may not be readily apparent or otherwise intuitive to many users.

Disclosed herein are techniques that overcome these and other shortcomings. A dynamic menu element, such as a button, is displayed. A user can select and drag the dynamic menu element over a particular content item that is also being displayed. That is, the user can touch the touchscreen where the dynamic menu element is displayed, with his or her fingertip, and then move the finger in question over the particular content item, while maintaining fingertip content with the touchscreen. When the dynamic menu element is dragged over the content item, the content item may change in appearance to indicate that there are associated actions that the user can select to perform in relation to the content item. Furthermore, a menu of actions contextual to the content item is displayed while the dynamic menu element remains over the content item. The user can then select a desired action to perform in relation to the content item.

Figure 1:
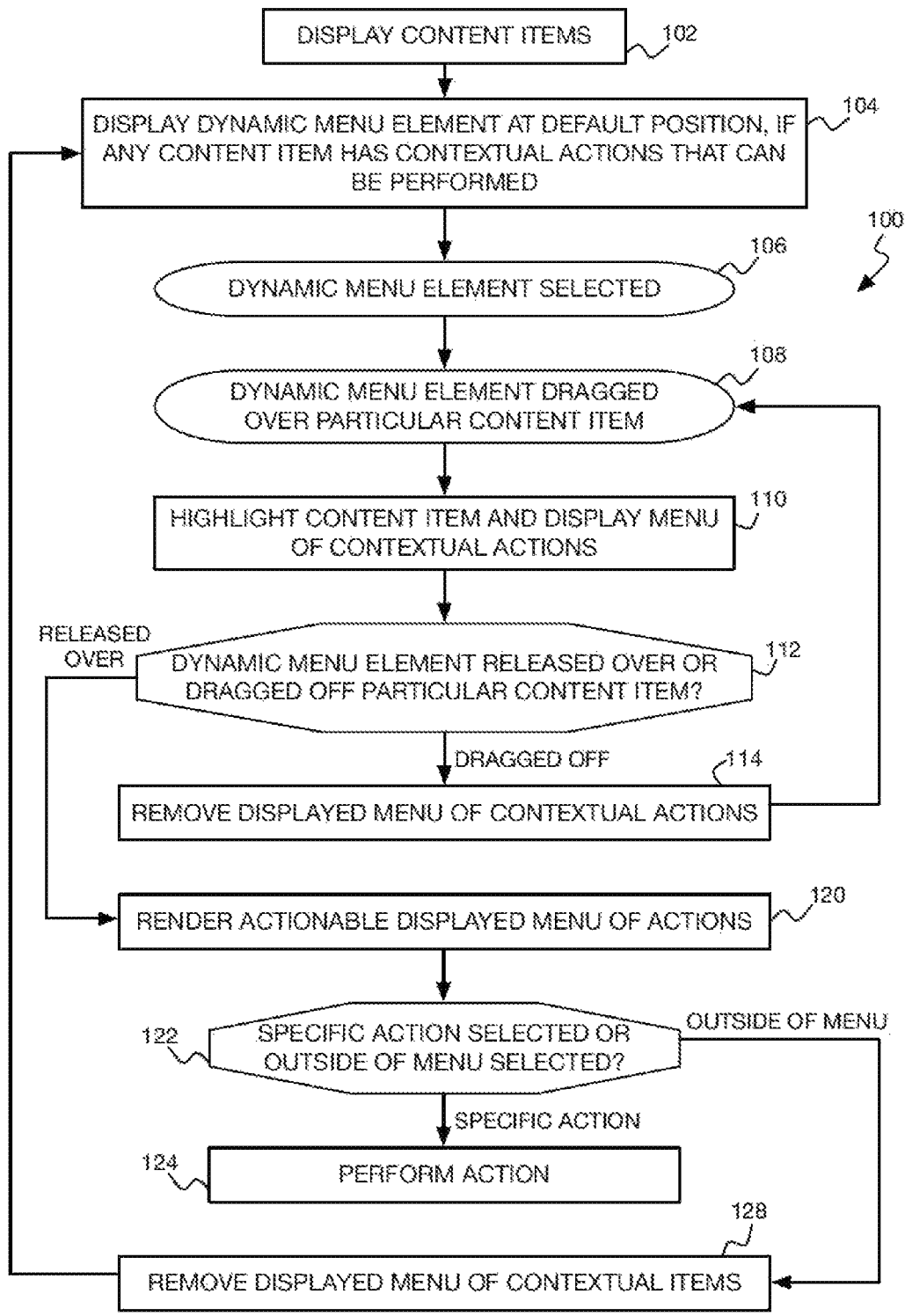
FIG. 1 is a flowchart of an example method for providing a dynamic contextual menu.

The user thus receives visual indication that there are actions that can be performed in relation to displayed content items, via the initial display of the display menu element; the display menu element may not be displayed, for instance, if no content items currently displayed on the touchscreen have contextual actions that can be performed in relation to them. The user also receives visual indication that there are actions that can be performed in relation to a specific such content item, via the change in appearance of the content item when the display menu element is dragged over the content item. The display menu element can be of a sufficiently large size to permit easy selection and thus interaction with the element via the touchscreen, FIG. 1 shows an example method 100 for providing a dynamic contextual menu. At least some parts of the method 100 can be performed by a computing device, such as a mobile computing device like a smartphone. The computing device has a display as well as an input device. The display may be a touchscreen display, for instance, where the input device is a touch-sensitive surface of the touchscreen display. The method 100 can be implemented as instructions stored on a non-transitory computer-readable data storage medium of the computing device, and executable by a processor of the computing device.

The computing device displays content items on its display (102). The content items can be of the same or different type. For instance, the content items may be email messages, calendar entries, social media entries, and so on. The content items may be different content items displayed on a dashboard that aggregates such content items that are related to a common system or functionality. Each content item is displayed at a different part of the display.

The computing device further displays a dynamic menu element at a default position on the display (104), if any of the content items has contextual actions that can be performed. The dynamic menu element may be a button, such as in the form of a circle or square. The default position may be in a particular corner of the display. A given content item is said to have contextual actions if a user can cause such an action to be performed in relation to the content item. By comparison, a content item that does not have contextual actions is one that just displays information, and in relation to which the user cannot interact.

As examples of contextual actions, a content item that is an email message can have actions including reply, forward, delete, print, and so on. The actions are contextual in that they can be specific or particular to the content item in question, and may not be applicable to other content items. For instance, a reply or forward contextual action is inapplicable to a content item that is a calendar entry. Different content items of the same type, however, can have similar if not identical contextual actions.

FIG. 2 shows example performance of parts 102 and 104 of the method 100. A display 200 of a computing device has displayed thereon content items 202A, 202B, 202C, 202D, 202E, and 202F, which are collectively referred to as the content items 202. In the example of FIG. 2, there are six content items 202, but there may be more or fewer content items 202 as well. In the example of FIG. 2, each content item 202 is displayed as a square, but the content items 202 may be displayed in other ways as well.

At least one of the content items 202 has associated therewith contextual actions that can be performed in relation to the content item 202 in question. Therefore, the display 200 also has displayed thereon a dynamic menu element 204. In the example of FIG. 2, the dynamic menu element 204 is in the form of a circle surrounding three horizontal lines, but the element 204 may be in another form as well. The dynamic menu element 204 is dynamic in that it is selectable and draggable within the display 200 via user interaction. The dynamic menu element 204 is a menu element in that the element 204 is used to display contextual actions (via corresponding contextual action buttons) and permit the selection of a desired contextual action (via its corresponding button) for performance in relation to a content item 202.

Referring back to FIG. 1, after the computing device has displayed the content items in part 102 and the dynamic menu element in part 104, a user may select the dynamic menu element (106). For instance, in relation to a touchscreen, the user may press the fingertip of a finger on the display where the dynamic menu element is being displayed, and maintain this fingertip against this portion of the display. If the display of the computing device is not a touchscreen display, the user may employ a pointing device like a touchpad or a mouse to move a pointer over the dynamic menu element, and then select the element by clicking and holding down a mouse button or touchpad button, or tapping and maintaining pressure against the touchpad.

The user may then drag the dynamic menu element over a particular content item (108). For instance, in relation to a touchscreen, the user may slide the fingertip still touching the display over a content item. If the display of the computing device is not a touchscreen display, the user may, while still holding down the mouse or touchpad button or still maintaining pressure against the touchpad, use the pointing device in question to move the pointer over the content item.

In response, if the content item over which the dynamic menu element has been dragged has contextual actions that can be performed in relation to the content item, the computing device can highlight the content item and display a menu of these contextual actions (110), such as in the form of corresponding contextual action buttons. Such highlighting can occur immediately, or a predetermined time after the dynamic menu element has been dragged over a content item having contextual actions. The content item may be highlighted by changing the background color of the content item, for instance, or by visually altering the appearance of the content item in another manner. The menu of contextual actions (via corresponding buttons) may be displayed near but not over the content item, so that the user can still view the content item as ell as the contextual actions that can be performed in relation to the content item.

The highlighting of the content item can visually indicate the content item to which the contextual actions of the menu pertain. That is, the highlighting can indicate that the displayed menu is related to the particular content item in question. Such content item highlighting can include displaying the menu button in a partially transparent menu, with a box surrounding the contextual actions (and their corresponding contextual action buttons) also displayed in a partially transparent menu. Such partial transparency is not explicitly depicted in the figures for illustrative clarity and convenience, however.

FIG. 3 shows example performance of parts 106, 108, and 110 of the method 100. The display 200 of the computing device has displayed thereon the content items 202, as in FIG. 2. The dynamic menu element 204 has been selected and dragged from its default position in FIG. 2 to over the content item 202A. In response, the computing device has displayed a menu 302 of contextual action buttons 304A, 304B, 304C (having associated contextual actions as indicated), which are collectively referred to as the contextual action buttons 304, and has highlighted the content item 202A. The highlighting of the content item 202A is indicated in FIG. 3 by shading. In the example of FIG. 3, there are three contextual action buttons 304, denoted as corresponding squares, but in other example, there may be more or fewer such buttons 304—and thus more or fewer corresponding contextual actions—which may be denoted in other ways as well.

Figure 4:
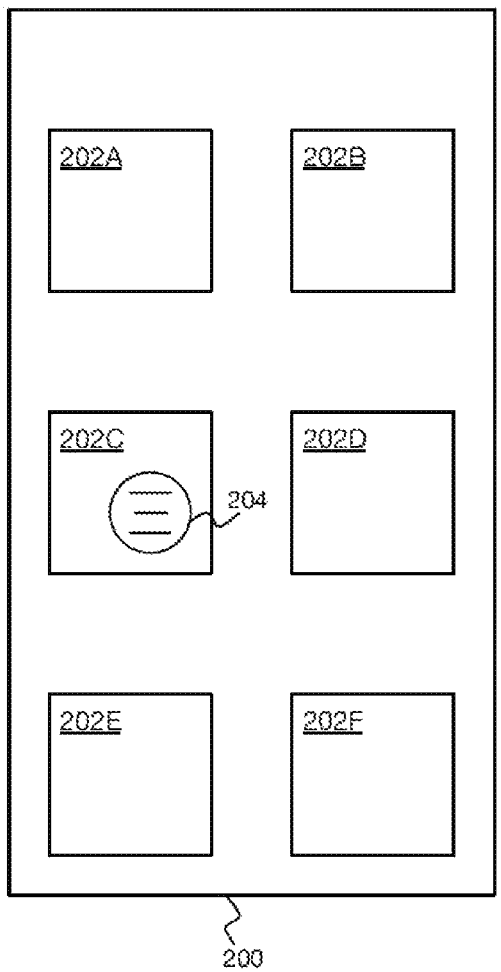

Referring back to FIG. 1, after the computing device has highlighted the content item over which the dynamic menu element has been dragged and has displayed the menu of contextual action buttons, and while the element is still being selected by the user, if the dynamic menu element is dragged off the content item in question (112), then the computing device removes the displayed menu of contextual items, and removes highlighting of the particular content item (114). For instance, in relation to a touchscreen, the user may slide the fingertip still touching the display off the content item. If the display is not a touchscreen display, the user may, while still holding down the mouse or touchpad button or still maintaining pressure against the touchpad, use the pointing device in question to move the pointer off the content item in question. The method 100 may then proceed back to part 108, FIG. 4 shows example performance of parts 112 and 114 of the method 100. The display 200 of the computing device has displayed thereon the content items 202, as in FIGS. 2 and 3. The dynamic menu element 204 is still selected, and has been dragged from over the content item 202A as in FIG. 3 to over the content item 202D. In response, the computing device has removed highlighting of the content item 202A, and has removed the menu 302 of contextual action buttons 304 of FIG. 3. Furthermore, in the example of FIG. 4, the content item 202C does not have any associated contextual actions, and therefore the computing device does not highlight the content item 202C, and does not display any menu of such (non-existent) contextual action buttons.

Figure 5:
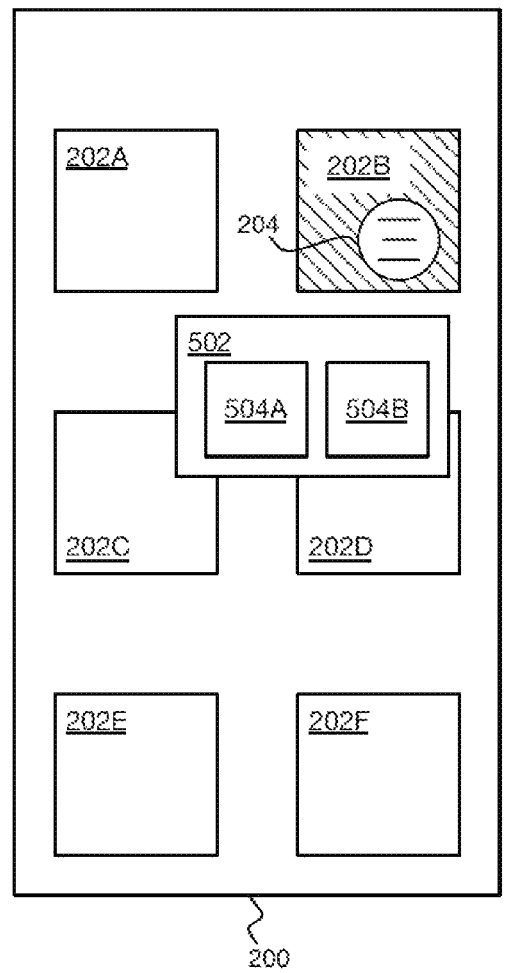

FIG. 5 also shows example performance of parts 112 and 114 of the method 100, as well as subsequent (re-)performance of parts 108 and 110. The display 200 of the computing device has displayed thereon the content items 202, as in FIGS. 2, 3, and 4. The dynamic menu element 204 is still selected, and has been dragged from over the content item 202A as in FIG. 3 to over the content item 202B. In response, the computing device has removed highlighting of the content item 202A, and has removed the menu 302 of contextual action buttons 304 of FIG. 3. Furthermore, the computing device has displayed a menu 502 of contextual action buttons 504A and 504B, which are collectively referred to as the contextual action buttons 504, and has highlighted the content item 202B.

FIG. 5 can also be considered as showing example (re-)performance of parts 108 and 110 in temporal order after FIG. 4, instead of after FIG. 3 as described in the preceding paragraph. That is, the dynamic menu element 204, while still being selected, can have been dragged from over the content item 202C to over the content item 202B. In response, the computing device displays the menu 502 of the contextual action buttons 504. In the example of FIG. 5, there are two contextual action buttons 504, but there may be more or fewer such action buttons 504, depending on the number of contextual actions associated with the content item 202B.

Referring back to FIG. 1, if the user releases the dynamic menu element while it is being displayed over the particular content item (112)—instead of dragging the dynamic menu element off the particular content item as has been described—then the computing device can render the actions of the displayed menu actionable (120). For instance, with respect to a touchscreen the user may remove the fingertip that is touching the display, or with respect to a non-touchscreen display, the user may release the mouse or touchpad button that is being pressed, or remove pressure that is being applied against the touchpad. Actionable can mean that a user can select an action (such as via its corresponding button) so that the computing device performs the action in relation to the particular content item. Prior to the displayed menu of actions being rendered actionable, no action may able to be selected, such that at that time the displayed menu of actions is not actionable.

For instance, in the example of FIG. 3, when the dynamic menu element 204 is selected and dragged over the content item 202A, the menu 302 of action buttons 304 corresponding to the actions associated with the content item 202A, is displayed. While the user maintains his or her fingertip against the display 200, or the user continues to press a pointing device button or continues to apply pressure against a touchpad, subsequent movement of the dynamic element 204 by the user does not result in any action button 304 being selected from the menu 302. If the user drags the dynamic menu element 204 downwards towards the content item 202C, for example, the menu 302 may be removed from the display 200 as soon as the element 204 is no longer (completely) over the content item 202A, such that the user will have not had an opportunity to select one of the action buttons 304 from the menu 302.

With continued reference to FIG. 1 as part of rendering the action buttons of the displayed menu actionable, the computing device may leave the dynamic menu element displayed at its last location (over the particular content item) when the user released his or her fingertip from the display, or released the pointing device button or removed pressure from the touchpad. If the user then selects one of the actions from the menu (122) via its corresponding action, then the computing device subsequently and responsively performs the selected action in relation to the particular content item (124). The user may press and then release (i.e., tap) the fingertip of a finger on the display where the desired action is being displayed. In the case of a non-touchscreen display, the user may use a pointing device to move a pointer over the desired action button, and then click a pointing device button or apply momentary pressure against the touchpad (i.e., tap the touchpad).

If the user instead, however, selects a portion of the display on which the menu of action buttons is not being displayed (124), then the computing device removes the displayed menu, and removes highlighting of the particular content item (128). That is, the user may make a selection outside of the menu, by pressing and releasing (i.e., tapping) the fingertip of a finger on the display outside of where the menu is displayed, or by using a pointing device to move a pointer on the display outside of the menu, and clicking a pointing device button or tapping the touchpad. The method 100 then proceeds from part 128 back to part 104, in which the computing device (again) displays the dynamic menu element at its default position.

Figure 6:
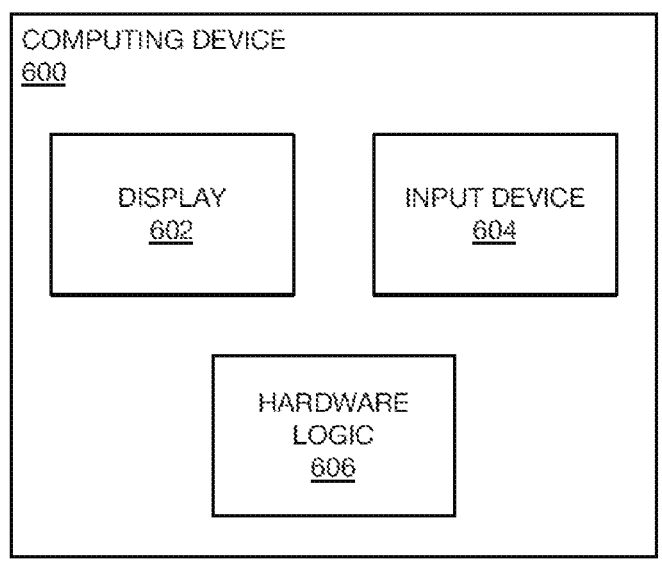
FIG. 6 is a block diagram of an example computing device that can perform the example method of FIG. 1.

FIG. 6 shows a block diagram an example computing device 600, such as a mobile computing device like a smartphone. The computing device 600 may perform the method 100 of FIG. 1 that has been described. The computing device 600 includes a display 602, an input device 604, and hardware logic 606. The computing device 600 can include other hardware components as well, in addition to those depicted in FIG. 6.

The display 602 can be a flat-panel display, such as a light-emitting display (LED) or an organic light-emitting display (OLED). The input device 604 may be a touchscreen surface of the display 602, in which case the input device 604 can be considered as being integrated with the display 602. The input device 604 may instead be a pointing device, such as a mouse or a touchpad.

The hardware logic 606 includes those components that permit the computing device 600 to perform the method 100. For instance, the hardware logic 606 may include a general-purpose processor and a non-transitory computer-readable data storage medium storing instructions that the processor executes. The hardware logic 606 may instead be an application-specific integrated circuit (ASIC), as another example.

The techniques that have been described herein provide a way by which a user receives visual indication that content items have associated contextual actions that can be performed in relation to the content items, while also permitting such actions to be displayed sufficiently large to permit easy selection by the user. The user receives visual indication that a given content item has associated contextual actions via a menu of such actions being displayed responsive to the user dragging a dynamic menu element over the content item. The dynamic menu element, as well as the contextual actions of the menu, can be displayed sufficiently large for easy selection by the user, even in the case where the computing device in question is a relatively small device like a smartphone or other mobile computing device.

The invention claimed is:

1. A method comprising:

displaying, by a computing device, a plurality of content items and a dynamic menu element at a default position;

responsive to selection and dragging of the dynamic menu element from the default position and over a particular content item, displaying, by the computing device, a menu of actions contextual to the particular content item and displaying, by the computing device, the dynamic menu element on the particular content item, the dynamic menu element not displayed at the default position while the menu of actions is displayed; and responsive to selection of a specific action of the menu of actions being displayed, performing, by the computing device, the selected specific action in relation to the particular content item.

2. The method of claim 1, further comprising, after displaying the menu of actions:

responsive to selection anywhere outside of the menu of actions being displayed, removing, by the computing device, the displayed menu of actions, and again displaying, by the computing device, the dynamic menu element at the default position.

3. The method of claim 1, further comprising:
responsive to selection and dragging of the dynamic menu element over the particular content item, highlighting, by the computing device, the particular content item to indicate that the displayed menu of actions is related to the particular content item.

4. The method of claim 1, further comprising, after displaying the menu of actions:
responsive to dragging the dynamic menu element off the particular content item, removing, by the computing device, the displayed menu of actions.

5. The method of claim 4, further comprising, after removing the displayed menu of actions:
responsive to dragging of the dynamic menu element over a different particular content item, displaying, by the computing device, a different menu of actions contextual to the different particular content item.

6. The method of claim 5, further comprising, after displaying the different menu of actions:
responsive to selection of a different specific action of the different menu of actions being displayed, performing, by the computing device, the selected different specific action in relation to the different particular content item.

7. The method of claim 1, further comprising, between displaying the menu of actions and performing the selected specific action:
responsive to release of the dynamic menu element over the particular content item, rendering actionable, by the computing device, the displayed menu of actions so that the actions of the displayed menu are selectable.

8. The method of claim 7, wherein prior to release of the dynamic menu element over the particular content item, the displayed menu of actions is non-actionable and no action is selectable.

9. The method of claim 1, wherein the menu of actions is displayed as a menu of action buttons.

10. A computing device comprising:
a display;
an input device; and
hardware logic to:
responsive to selection and dragging, via the input device, of a dynamic menu element displayed on the display from a default position and over a content item displayed on the display, show on the display a dynamic menu contextual to the content item and show the dynamic menu element on the content item, the dynamic menu element not displayed at the default position while the dynamic menu is displayed; and
responsive to selection of an action of the dynamic menu, perform the action in relation to the content item.

11. The computing device of claim 10, wherein the display is a touchscreen display and the input device is a touch-sensitive surface of the touchscreen display.

12. The computing device of claim 10, wherein the hardware logic is further to:
responsive to selection of the display anywhere outside of the dynamic menu, via the input device, remove the dynamic menu and again display the dynamic menu element at the default position.

13. The computing device of claim 10, wherein the hardware logic is further to:
responsive to selection and dragging of the dynamic menu element over the content item, via the input device, highlight the content item to indicate that the displayed dynamic menu is related to the content item.

14. The computing device of claim 13, wherein the hardware logic is further to:
responsive to dragging the dynamic menu element off the content item via the input device, remove the dynamic menu from the display.

15. The computing device of claim 10, wherein the hardware logic is further to:
responsive to release of the dynamic menu element over the content item via the input device, render the dynamic menu actionable so that the action is selectable.

16. The computing device of claim 15, wherein prior to release of the dynamic menu element over the content item via the input device, the dynamic menu is non-actionable and the action is not selectable.

17. The computing device of claim 10, wherein the hardware logic is further to:
responsive to dragging of the dynamic menu element over a different particular content item, display a different menu of actions contextual to the different particular content item.

18. The computing device of claim 17, wherein the hardware logic is further to:
responsive to selection of a different specific action of the different menu of actions being displayed, perform the selected different specific action in relation to the different particular content item.

19. A non-transitory computer-readable data storage medium storing instructions executable by a computing device to:
display a dynamic menu element at a default position and a plurality of content items;
responsive to selection and dragging of the dynamic menu element away from the default position and over a particular content item, display a menu of actions contextual to the particular content item and the dynamic menu element on the particular content item, and highlight the particular content item to indicate that the displayed menu of actions is related to the particular content item, the dynamic menu element not displayed at the default position while the menu of actions is displayed;
responsive to dragging the dynamic menu element off the particular content item, remove the displayed menu of actions;
responsive to release of the dynamic menu element over the particular content item, render the displayed menu of actions actionable so that the actions of the displayed menu of actions are selectable, wherein prior to release of the dynamic menu element over the particular content item, the displayed menu of actions is non-actionable and no action is selectable;
responsive to selection of a specific action of the menu of actions being displayed, performing, by the computing device, the selected specific action in relation to the particular content item; and
responsive to selection anywhere outside of the menu of actions, remove the displayed menu of actions and redisplay the dynamic menu element at the default position.

20. The non-transitory computer-readable data storage medium of claim 19, wherein the instructions are executable by the computing device to further:

responsive to dragging of the dynamic menu element over a different particular content item, display a different menu of actions contextual to the different particular content item; and responsive to selection of a different specific action of the different menu of actions being displayed, perform the selected different specific action in relation to the different particular content item.

\* \* \* \* \*